(12) United States Patent
Bluvband et al.

(10) Patent No.: US 8,352,399 B2
(45) Date of Patent: Jan. 8, 2013

(54) SYSTEM AND METHOD FOR BOUNCING FAILURE ANALYSIS

(75) Inventors: Zigmund Bluvband, Rishon LeZion (IL); Rafi Polak, Haifa (IL)

(73) Assignee: Favoweb Ltd., Tel-Aviv (IL)

( * ) Notice: Subject to any disclaimer, the term of this patent is extended or adjusted under 35 U.S.C. 154(b) by 0 days.

(21) Appl. No.: 13/154,734

(22) Filed: Jun. 7, 2011

(65) Prior Publication Data

US 2012/0017125 A1   Jan. 19, 2012

Related U.S. Application Data

(63) Continuation of application No. 11/795,562, filed as application No. PCT/IL2006/000083 on Jan. 19, 2006, now abandoned.

(60) Provisional application No. 60/644,570, filed on Jan. 19, 2005.

(51) Int. Cl.
*G06F 17/00* (2006.01)
*G06N 5/02* (2006.01)

(52) U.S. Cl. ........................................... 706/46
(58) Field of Classification Search ................ None
See application file for complete search history.

(56) References Cited

PUBLICATIONS

Wang et al. "Multiple Fault Diagnosis Using n-Detection Tests", ICCD'03, pp. 4.*
Fenelon et al. "Towards Integrated Safety Analysis and Design", ACM SIGAPP Applied Computing Review, vol. 2, Issue 1, 1994, pp. 21-32.*
"Procedure for Performing a Failure Mode, Effects and Criticality Analysis", Military Standard, Nov. 24, 1980, pp. 1-80.
Vesely et al. "Fault Tree Handbook", Systems and Reliability Research Office of Nuclear Regulatory Research, Jan. 31, 1981, pp. 1-209.
Fenelon, et al., "An Integrated Tool Set for Software Safety Analysis", Journal of Systems and Software, vol. 21, No. 3, Jun. 1, 1993, pp. 279-290.
Supplementary European Search Report for Application No. EP 06 70 0964 mailed Apr. 12, 2012.

* cited by examiner

*Primary Examiner* — Jeffrey A Gaffin
*Assistant Examiner* — Li-Wu Chang
(74) *Attorney, Agent, or Firm* — Pearl Cohen Zedek Latzer, LLP

(57) ABSTRACT

A method for analyzing fault modes that may cause a fault is presented in which a multi-point analysis may be performed to identify multi fault modes that are interrelated in causing the fault. The method provides for easy and systematic switching from a top-down to bottom-up approaches of analysis to insure accurate and easy to perform multi-point analysis of the related fault modes.

10 Claims, 4 Drawing Sheets

SYSTEM AND METHOD FOR BOUNCING FAILURE ANALYSIS

CROSS-REFERENCE TO RELATED APPLICATIONS

This application is a continuation of U.S. patent application Ser. No. 11/795,562, filed Mar. 12, 2008, now abandoned which entered the national phase on Jul. 18, 2007, and which is a National Phase Application of PCT International Application No. PCT/IL2006/000083, entitled A System and Method for Bouncing Failure Analysis, published on Jul. 27, 2006 as International Publication No. WO 2006/077590, International filing date Jan. 19, 2006, claiming priority of U.S. Provisional Application 60/644,570, filed Jan. 19, 2005, all of which are incorporated herein by reference in their entirety.

FIELD OF INVENTION

This invention relates to failure mode effects and causes analysis—a method for root cause studies, failure effect and risk analysis, defects prevention and failures mitigation, i.e. products, projects, services and processes (in short, Object Under Analysis or OUA) improvement.

BACKGROUND OF THE INVENTION

Traditional methods for analysis of failures in a system, Failure Mode Effect Analysis (FMEA) and Fault Tree Analysis (FTA), have three main differences: boundaries of the analysis, direction of analysis, and presentation of the analysis process and results. FMEA deals with single point failures, is built bottom-up, and is presented mostly in the form of tables, while FTA analyzes combinations of failures, is built top-down, and is visually presented as a logic diagram. The finalized FMEA table and to big extent the process of FMEA itself are expected to cover ALL End Effects (EE). While dealing with all possible EE, as potential outcome of analyzed Failure Mode (FM), FMEA lacks the capability to sort/prioritize them—EE are presented as couple—EE attached to the FM under investigation, randomly distributed at different points of the table in a "heap". In contrary, the FTA considers one specific EE at all—covering all combinations of Failure Modes (FM) causing this EE only. Here, by taking into account combinations of failures, FTA avoids the shortcomings of FMEA. However, being heavily dependent on personal experience and knowledge, even "fine art" of a performer-analyst, FTA has a tendency to miss some of (FM) or FM combinations.

Most failure analysis and studies are based on one of these approaches (FMEA or FTA). Rarely both FMEA and FTA will be performed, and when performed, these will be separate activities executed one after another—never seriously intertwining.

The present invention presents a system, methodology and procedure as a tool capable to maximize the advantages and at the same time to minimize the shortcomings of both separate methodologies. The result is a dramatic improvement in the organizing and systematization of the analyst's work, leading to the full coverage of all potentially significant failure conditions and combinations.

SUMMARY OF THE INVENTION

The invention introduces Bouncing Failure Analysis (BFA)—an innovative approach replacing and extending the traditional and widely used Failure Analysis (FA) techniques: Failure Mode Effect Analysis (FMEA) which is an example of the "bottom-up" approach and Fault Tree Analysis (FTA) which is an example of the "top-down" approach and all modifications of both methodologies: Event Tree Analysis, Dynamic FMEA, etc. When using the FTA approach there is possibility to miss some of the FMs or combinations thereof and the result of the analysis highly depends on the experience of the user. When using the FMEA approach the analysis refers only to single-point FMs. The present invention may bridge the two methodologies allowing an analyst to "bounce" from one to another, i.e. to switch from one methodology to the other, in order to allow analysis of more than a single FM at a time as in the "top-down" approach and concurrently to rely on the completeness of analysis of the "bottom-up" methodology. Bouncing allows switching between top-down and bottom-up analysis methods, from FT diagram to FM table and back, changing the presentation (FT uses the tree diagram and FMEA uses the table presentation) and the direction of the analysis for convenience of analysis at any point in the process. The present invention extends FMEA methodology taking into account the combinations of failure modes (as in FTA instead of just one Failure Mode at a time as in traditional FMEA). The present invention replaces the traditional "top-down" FTA process by the "bottom-up" approach, far more intuitive and easy for most engineers. It enables initiation of bouncing from time to time to the "top-down" approach and back, as well as incorporating "side effects" (which are the effect of events outside of the OUA on the EEs), i.e. Top-down, Bottom-up and Side-to-side analysis approaches, ensuring analysis verification and subsequent update. The present invention results in a highly efficient, systematical study of failure modes and a dramatic decrease of Time to Acceptable Analysis (TTAA), i.e. decreasing the period of time from the beginning of analysis to the satisfactory report.

This invention provides a clear and easy step-by-step guide to perform Bouncing Failure Analysis (BFA) method and system according to embodiments of the present invention. The result is a complete coverage of all failure modes followed by the testability and detectability analyses.

According to some embodiments of the present invention the analysis may start with a traditional single point (i.e. one-at-a-time) failure analysis and clear understanding or definition of all possible End Effects (i.e. possible out-come of such failure) for the Object Under Analysis (OUA). creation of a complete "Interaction Matrix" (Pair-Combination Matrix) for double-, triple- and multi-point failures, provides the ways to bounce between Bottom-up to Top-down and back (FMEA to FTA), bringing in the methodology for cutting-down the size of the Interaction Matrices, and finally presenting comprehensive results: concurrent combinations of OUA failures, external triggers, catalysts with corresponding sequences.

In order to optimize the process and the outcomes of analysis methods according to this invention it is possible to divide all FMs (a middle-size system may have hundreds of FMs) into families/categories applying a methodology of defect classification (taxonomy). Such taxonomy of failure modes (FMs) may be used to combine the entire families of FMs making the analysis according to some embodiments of the present invention easy to perform, present and understand, as well as interpret and reuse the results. Additional advantageous outcome of using taxonomy of FMs is a creation of the pairs of symbiotic on one hand and incompatible on the other hand families of FMs. For example, the FM Family "Hermetic Problem" which may include failure modes like crack, hole, break in the case, housing, wall, etc. all of them are possible failures members in the family "hermetic problem", and the Catalyst Family "High Humidity" which may include members such as rain, snow, fog, etc. A member in hermetic problem and a member of the catalyst family or a side effect may cause same or similar EE when applied simultaneously or in a certain order to OUA. For example hermetic problem occurring after high humidity will not cause any problem, that is the EE will not happen and occurrence of high humidity after an hermetic problem may cause the EE.

The introduction of failure analysis method according to some embodiments of the present invention may provide a solution, long-awaited by industry, which is at the same time complete, time-saving, and easily implemented in software interpretation of the traditional practices: FMECA, FTA, Event Tree Analysis, Testability Analysis and Process/Design FMEA methodologies.

The advantages of the present invention's performance one can easily understand thinking about a simple, but very important example: the Cause Effect Diagram (also known as Fishbone) presenting not only single point failures (typical), but also the combination of possible Men, Machine, Method, Measurement, Material and Environment causes.

BRIEF DESCRIPTION OF THE DRAWINGS

The present invention will be understood and appreciated more fully from the following detailed description taken in conjunction with the figures in which.

Figure 1:
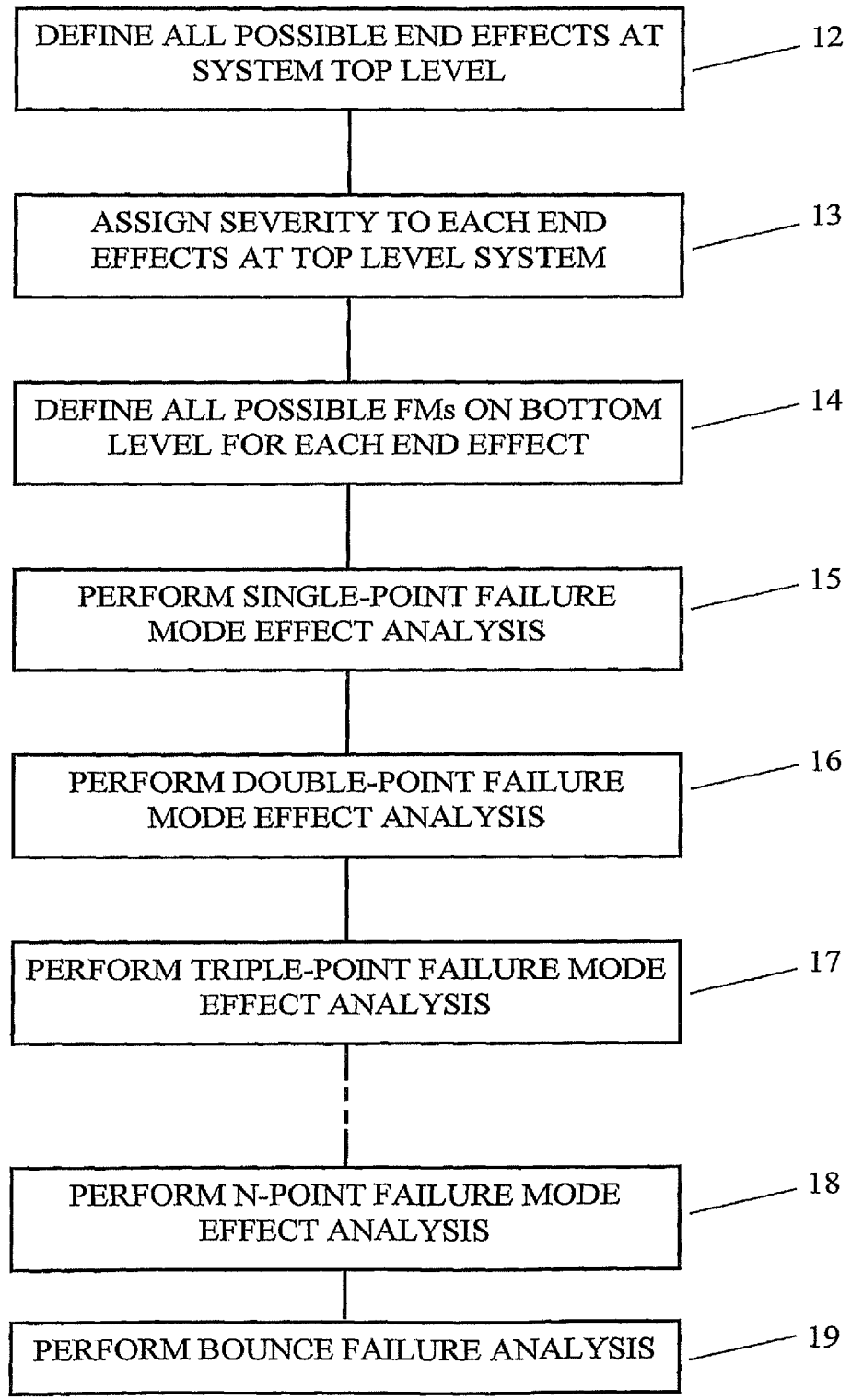
FIG. 1 is a schematic flow diagram of an embodiment according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

EMBODIMENT EXAMPLES ACCORDING TO THE PRESENT INVENTION

Following is a step-by-step description of one of the embodiments of failure analysis method according to the present invention, illustrated by FIG. 1, which is a schematic flow diagram of a method of performing failure analysis according to some embodiments of the invention and is now being referred to. Initially, all possible end effects (i.e. resulting malfunctions of the examined system due to a defined event) of the examined object (step 12) at top level are identified using possibly any known analysis method and possibly relying on a list of functional requirements of said system. Following this step an appropriate severity may optionally be assigned (step 13) to each of the end effects (EEs) subject to the malfunctioning consequences. Following this step, all possible failure modes (FMs) that can cause each of the EEs may be defined (step 14) at the bottom (component) level (i.e. single-point analysis). This may be done from an existing failure mode database for the object under analysis (OUA). Such databases are known in the art, such as FMD-97 (Failure Mode/Mechanism Distributions, produced by Reliability Analysis Center. Statistical compilation of failure mode distributions for a wide range of components). The analysis of steps 12-14 may result for an object comprising components 1-4 and for required functionalities 1 and 2 of the examined object a list of EEs which may be denoted EE11, EE12 etc. for functionality 1, EE21, EE22 etc. for functionality 2, etc. This analysis may further result a list of FMs for the examined components, which may be denoted C1FM1, C1FM2 for FMs 1 and 2 of object 1, C2FM1, C2FM2, etc. for object 2, etc. On the above described resulting lists the FMs may be analyzed (step 15) using any known failure mode event analysis (FMEA) method for a single-point failure (i.e.—analyzing the influence of a single event only). This analysis may result a true/false indication or a true/false indication with an associated approximated probability for the FM to occur. At this step an assignment of association of the various FMs to appropriate EEs may also be done.

Figure 2:
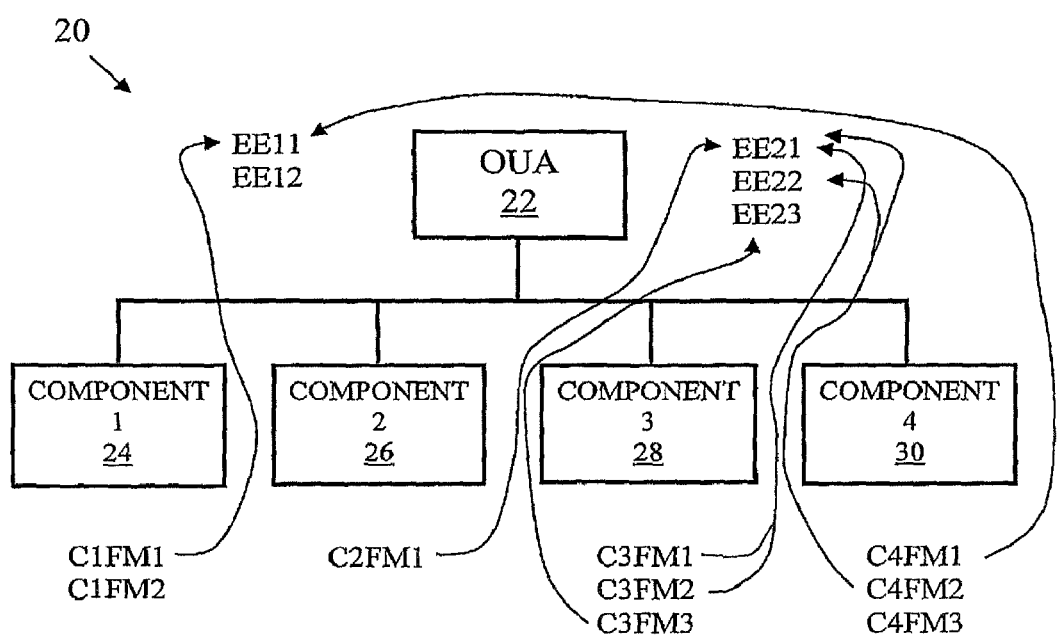
FIG. 2 is a schematic block diagram of fault mode analysis according to some embodiments of the present invention.

Attention is made now also to FIG. 2, which is a schematic block diagram representation 20 of a fault-mode analysis of OUA 22 according to some embodiments of the present invention. Attention is also made to FIG. 3, which is a schematic tree diagram 100 of triple-point fault analysis result according to some embodiments of the present invention OUA 22 may comprise components 1-4 denoted 24, 26, 28 and 30 respectively. The analyzed EE for OUA 22 are listed on both sides of OUA 22. EE11 and EE12 on the right for a first functionality and EE21, EE22 and EE23 on the left for a second functionality. The possible FMs are listed under each associated component: C1FM1, C1FM2 for component 1 denoted 24, C2FM1 for component 2 denoted 26 and so on. The association of EEs with their corresponding FMs is represented by single-arrowed curved line connecting FMs with their associated EEs. The results of the single-point analysis are presented in FIG. 3 as the group of FMs denoted 102.

At this stage a double-point failure analysis (step 16) may be performed. Double-point analysis takes into consideration combinations of two different FMs which may cause a specified EE, either when happening concurrently, or when happening one-at-a-time, with a first order or a second order of occurrence in time. This analysis may rely on the association prepared according to the description above. This analysis may result, for a defined OUA, for end event EE21 and as per defined circumstances, the results which are illustrated in Table 1 presented in FIG. 4.

Figure 3:
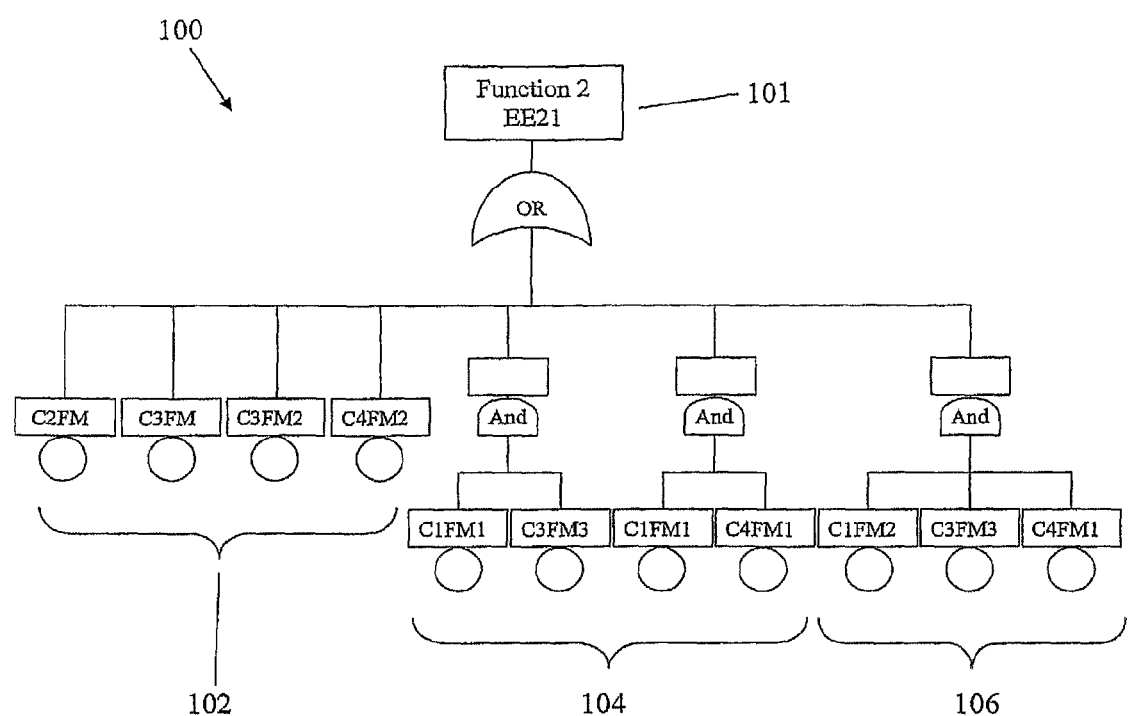
FIG. 3 is a schematic tree diagram of triple-point fault analysis result according to some embodiments of the present invention.
Figure 4:
FIG. 4 presents Table 1.

In Table 1 presented in FIG. 4 all grayed squares represent combinations of two FMs which were excluded from the list of FMs the combination of which may have been the cause for EE21. Since the result of this analysis will always lead to a symmetrical matrix in which the symmetry line connects the square in coordinate C1FM1-C1FM1 with that of coordinate C4FM3-C4FM3, for the sake of clarity the lower-left half of the matrix of Table 1 was covered by wave-like pattern and the results corresponding to these squares, being identical to their corresponding twin-square in the other part of the table, are not being considered further in this description of the invention. Further, a step of excluding of all couples of FMs in the table which may not be a reason for the investigated EE21 based on the nature of the OUA is carried out. In the example of Table 1 these are symbolized by the four squares covered by the black-slashed line pattern. At the end of this step all white squares in Table 1 represent couples of different FMs which may be a cause to the investigated EE21. This analysis may reflect, beyond the information gathered during the single-point analysis, also knowledge of the actual occurrence-relations between such couples of different FMs and the possible effect of related occurrence of these FMs with respect to one another on the analyzed EE. In order to properly produce Table 1 first exclude all failure modes that cause the selected EE21 which were identified in the single-point failure analysis (the whole rows and columns). Second (optional), exclude all failure modes which can never be a cause for the selected effect based on the nature of the OUA. From the association of FMs to EE21 as presented in FIG. 2 some of the squares in table 1 may be marked as excluded (black-slashed lines). Further, according to the data in FIG. 2 it may be concluded that C4FM3 may not have any two-point combination that may cause EE21. This stage of analysis may typically end with a reduced number of optional two-point (couples) of FMs that may be the cause for EE21 either happening concurrently or ordered one after the other in time. The results of the double-point analysis are presented in FIG. 3 as the group of FMs denoted 104.

Based on the previous step, a shortened Interaction Matrix may be produced, as presented in table 2.

TABLE 2

| EE21 | | | | |
|---|---|---|---|---|
| | C1FM1 | C1FM2 | C3FM3 | C4FM1 |
| C1FM1 disabled→ | C1FM1 | | * | ⌐ |
| because can't be part of triple | C1FM2 | | | |
| because any | C3FM3 | | | |
| combination of 3 with I1FM1 will include existing double point | C4FM1 | | | |

Legend:
* C1FM1 together with C4FM1
⌐ First C1FM1 then C4FM1
⌐← First C4FM1 then C1FM1

Table 2 includes the internal FM only, i.e. representation of interactions of only internal FMs, (FMs that may happen inside the examined system, as opposed to FMs that may happen outside of the examined system but may have an implication on the EE). The white squares represent two-point occurrences that may lead to the result of EE21 (in this example), while the symbols (such "*" or "→") in some of the squares represent the order-of-occurrence of one of the two FMs with respect to that of the other one, that will cause this result. This order-of-occurrence in some cases practically represents an inductive approach and a kind of forward logic in "cause" to "effect" or "time" to "time" ("instant" to "instant") event sequences or in time propagation. This analysis may be extending the previous analysis by taking additional factors into account. First, catalyst type factors, the presence of which may expedite or accelerate or increase the probability of occurrence of EE21 (in this example). Second, triggers (which are external factors) which are able to activate the EE. In this respect a trigger enables an internal failure mode (FM) to become the EE cause.

In this manner it is possible to define also the sequence of the failure modes in the double-point failure. During selection in the matrix of table 2, additional background process may occur. All failure modes that cannot be a part of the triple point failure analysis will be disabled, similarly to the disabling of occurrences which were not possible in the producing of table 1.

Similar to the double-point analysis, it is now possible to produce a triple-point analysis (step 17) by drilling further 'down' to the desired failure mode (this failure mode must be enabled). By applying this methodology a selected failure mode with operation type is received and another shortened matrix. The operation type may be "*" or "→" where "*" to indicate that a failure mode in the shortened matrix happen together with selected couples of FMs at the previous step failure mode(s) and "→" to indicate that failure modes in the shortened matrix happen after selected couples of FMs at the previous step failure mode(s)). The selection in the cells of the matrix of Table 3 may define a triple-point failure that defines the occurrence of triple FMs that may cause a specified EE. To achieve that the same technique as disclosed above with respect to the double-point failure analysis may be used. The results of the double-point analysis are presented in FIG. 3 as the group of FMs denoted 106.

During the triple-point analysis described above a target fault tree 100 (FIG. 3) for EE21 (101 in FIG. 3) may be produced and displayed automatically. The analyst using the methodology of the present invention can switch (or 'bounce') between "bottom-up" to "top-down" approaches as well as between table and graphical presentations.

TABLE 3

| Triple Point Failure EE21 C1FM2 | | | |
|---|---|---|---|
| | C3FM3 | C4FM1 | |
| C3FM3 | | * | → Results a triple point failure |
| C4FM1 | | | C1FM2* C3FM3 * C4FM1 |

In Table 3 C1FM2 is held "true", which by itself cannot cause EE21, and the various combinations of C3FM3 and C4FM1 are investigated, looking whether or not there is a combination of the two which may cause EE21 and in what order of occurrence. The process involves transfer of results of the evaluation into FMEA tables. First FMEA table is built for single-point failure analysis, then for double-point failure analysis and then for triple-point failure analysis and so on.

The methodology of drilling down with the fault analysis may be further repeated to the "n" level, as may be desired or required (step 18).

Activation of the methodology of the present invention for calculations; sensitivity analysis, reverse analysis, testability analysis, isolation tree construction etc. is possible at this stage.

Build FMEA back from the resulting FTA with combined failure modes—actually the minimal cut-sets (MCS), etc. This is the last step of analysis (step 19) in which it is possible to bounce (BFA) between FMEA tables and FTA trees as may be required or at the convenience of the analyst. This step may be performed as many times as needed to perform different types of study and analyses, for different parts of OUA and in different aspects, directions including time dimension.

FIG. 3 represents result of bounce after single, double and triple point steps. The graphical tree representation (actually a FTA) is based on previously described processes.

Utilization of the Invention

The power of Failure Mode Analysis as a design and improvement tool has been recognized increasingly by Industry, Services and Scientific Community. The method of failure mode analysis according to the present invention brings a revolutionary empowerment of the traditional FMEA & FTA approaches turning both techniques into more effective from the time-consumption point of view and much more efficient in a large spectrum of applications, such as Safety, Security, Testability, Maintainability, Logistics, Quality, Reliability, Risk Management, and Verification of compliance to different failure-related Regulations. Being clearly defined and based on well-systemized algorithm, the method of failure mode analysis according to the present invention may be easily implemented in a software tool. As such, the tool functioning according to embodiments of the present invention may have the following advantages:

- BFA is extremely useful in equipment and process planning, creation, failure analysis and improvement in automotive, pharmaceutical, medical devices, avionics, electronics, communication, service, medicine, software, etc. industries.
- BFA methodology, by its nature, may insure completeness of study. This feature is extremely important in the safety applications.
- BFA methodology can be used for verification of previously done failure mode analyses (FMEA, FTA, etc) results, especially during investigation of accidents.
- The BFA methodology is a unique analysis that can be carried out in all possible directions: bottom-up, top-down, aside (including investigating effect of external FMs), as well as in time. Thus, the BFA methodology may be considered a "360° approach".
- BFA methodology can be used especially when the depth of analysis is known, for example the depth of analysis required for Fuzing systems safety (according with, for example, MIL-STD-1316 (Fuze Design Safety Criteria)—that requires analysis up to double point failure), or as for Nuclear Industry, where standards requires analysis up to eight point failures.
- BFA methodology may provide very important and accurate data for building Isolation and Troubleshooting procedures.

It will be appreciated by persons of ordinary skill in the art that according to some embodiments of the present invention other designs of methodology for failure analysis involving multi-point fault mode analysis according to the principles of the present invention are possible and are in the scope of this application.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What we claim is:

1. A method for failure analysis in a system, the method comprising:
    identifying at least one possible End Effect of failure in an object of the system;
    identifying N possible fault modes of the object;
    building an N×N interaction matrix of all possible fault modes;
    excluding from said interaction matrix and defining as single-point fault modes all fault modes that can cause said End Effect when occurring alone;
    excluding from the interaction matrix left after the previous excluding step and defining as double-point fault modes all fault modes that can cause said End Effect in combination with one other fault mode; and
    performing additional steps of excluding, wherein in each step of excluding, all fault modes that can cause said End Effect in combination with a number (n−1) of other fault modes are defined as n-point fault modes and excluded from the interaction matrix left after the previous excluding step, wherein the number (n−1) of other fault modes is one more than in the previous excluding step, the performing of excluding steps ceases after excluding all fault modes that can cause said End Effect in combination with all the other fault modes left in the interaction matrix.

2. The method of claim 1 further comprising in each step of identifying, for n greater than 1, a step of indicating the nature of occurrence of the n-point fault modes with respect to each other, said indication is selected from the group comprising concurrently and sequentially and don't-care.

3. The method of claim 1 further comprising:
    producing a fault tree graph representation of said N possible fault modes.

4. The method of claim 1 further comprising:
    producing a failure mode effect table representation of said N possible fault modes.

5. The method of claim 3 wherein said representation is produced using top-down approach and bottom-up approach interchangeably during said production of said representation.

6. The method of claim 2 further comprising:
    producing a fault tree graph representation of said N possible fault modes.

7. The method of claim 2 further comprising:
    producing a failure mode effect table representation of said N possible fault modes.

8. The method of claim 4 wherein said representation is produced using top-down approach and bottom-up approach interchangeably during said production of said representation.

9. The method of claim 6 wherein said representation is produced using top-down approach and bottom-up approach interchangeably during said production of said representation.

10. The method of claim 7 wherein said representation is produced using top-down approach and bottom-up approach interchangeably during said production of said representation.

* * * * *